United States Patent [19]

Harper

[11] 4,433,069
[45] Feb. 21, 1984

[54] METHOD FOR PREPARING FLAME RESISTANT POLYSILOXANE FOAMS AND FOAMS PREPARED THEREBY

[75] Inventor: Jack R. Harper, Midland, Mich.

[73] Assignee: Dow Corning Corporation, Midland, Mich.

[21] Appl. No.: 455,431

[22] Filed: Jan. 3, 1983

[51] Int. Cl.$^3$ .............................................. C08J 9/02
[52] U.S. Cl. ...................................... 521/99; 521/54; 521/103; 521/122; 521/154; 523/218; 523/219
[58] Field of Search ................... 523/218, 219; 521/54, 521/154, 103, 122, 99

[56] References Cited

U.S. PATENT DOCUMENTS

| | | | |
|---|---|---|---|
| 2,956,032 | 10/1960 | Joyce | 260/2.5 |
| 3,317,455 | 5/1967 | Blome et al. | 523/218 |
| 3,419,593 | 12/1966 | Willing | 260/448.2 |
| 3,425,967 | 2/1969 | Modic | 260/2.5 |
| 3,445,420 | 5/1969 | Kookootsedes et al. | 260/37 |
| 3,453,228 | 7/1969 | Metevia et al. | 260/37 |
| 3,453,234 | 7/1969 | Kookootsedes | 260/46.5 |
| 3,923,705 | 12/1975 | Smith | 260/2.5 |
| 4,000,108 | 12/1976 | Yokokawa et al. | 521/154 |
| 4,026,842 | 5/1977 | Lee et al. | 260/2.5 |
| 4,072,635 | 2/1978 | Jeram | 523/218 |
| 4,082,702 | 4/1978 | Harper | 260/2.5 |
| 4,112,179 | 9/1978 | Maccalous et al. | 523/218 |
| 4,189,545 | 2/1980 | Modic | 521/131 |
| 4,259,455 | 3/1981 | Hitchcock | 521/122 |
| 4,286,013 | 8/1981 | Daroga et al. | 428/266 |
| 4,302,917 | 12/1981 | Fermvik | 52/221 |

OTHER PUBLICATIONS

Kirk–Othmer Encyclopedia of Chemical Technology, Second Edition, Interscience Publishers, N.Y.

*Primary Examiner*—Morton Foelak
*Attorney, Agent, or Firm*—Robert Spector

[57] ABSTRACT

Cured polyorganosiloxane foams exhibiting a uniquely high resistance to burn-through and disintegration when exposed to flames contain at least 0.1% by weight each, based on the weight of said foam, of at least one finely divided nonmetallic fibrous heat resistant material, at least one finely divided nonmetallic cellular heat resistant material, and at least 5 ppm of platinum in elemental or chemically combined form. The total concentration of heat resistant materials should not exceed 40%, based on the weight of the foam. This invention also provides a method for preparing flame retardant polyorganosiloxane foams.

29 Claims, No Drawings

METHOD FOR PREPARING FLAME RESISTANT POLYSILOXANE FOAMS AND FOAMS PREPARED THEREBY

BACKGROUND OF THE INVENTION

1. Field of the Invention

This invention relates to flame retardant polyorganosiloxane foams. More particularly, this invention relates to polyorganosiloxane foams that exhibit a high resistance to burning and disintegration when exposed to the extreme heat generated by flames, e.g. 2000° C. and higher, and a preferred method for preparing these foams.

2. Description of the Prior Art

Polyorganosiloxane foams can be rendered flame retardant using materials such as platinum and carbon black that do not evolve noxious or toxic vapors at elevated temperatures. Some polyorganosiloxane foams of this type will form a compressive seal when the ingredients employed to prepare the foam are reacted in a cavity or passageway, which makes these foams desirable for use as penetration seals in buildings and other types of construction.

In many buildings, particularly of the multifamily residential or commercial type, the walls and floors contain numerous passages connecting adjacent sections of the building. These passages are used for pipes, electrical conductors, ventilation ducts and conduits. The remaining space in these passages is usually occupied by solid materials referred to as penetration seals. In the event of a fire in one section of the building, the penetration seals are intended to prevent the passage of smoke, other vapors, and water into adjoining sections. In addition, the seals should be sufficiently flame retardant that they will not permit the flames in one section to spread to adjoining sections until the adjoining sections can be safety evacuated. To function effectively as a penetration seal and fire stop, the polyorganosiloxane foam should withstand prolonged contact by flames having temperatures such as 2000° C. before the flame can completely burn through the seal.

Various methods for preparing flame retardant polyorganosiloxane foams are described in the prior art. Ronald L. Joyce, in U.S. Pat. No. 2,956,032, issued on October 11, 1960, discloses elastomeric polyorganosilane foams containing nickelous bromide, pentabromoethylbenzene, or pentabromotoluene as flame retarding agents. The use of mixtures containing asbestos and fibrous potassium titanate as flame retarding additives for polyorganosiloxane foams is taught in U.S. Pat. No. 3,425,967, issued on February 4, 1969, to Modic. Lee and Ronk in U.S. Pat. No. 4,026,842, issued on May 31, 1977, and Smith in U.S. Pat. No. 3,923,705, issued on Dec. 2, 1975, employ platinum or a platinum compound to improve flame retardancy of polyorganosiloxane foams prepared by reacting organohydrogen siloxanes and siloxanes containing silicon-bonded hydroxyl groups. Smith teaches that flame retardancy can be further improved by the optional addition of carbon black.

U.S. Pat. No. 4,082,702, issued on April 4, 1978, to Harper, discloses syntactic polyurethane foams containing conventional flame retarding agents, such as tris(2-chloroethyl)phosphate. The flexural strength of the foam is increased by the presence of noncombustible flexible fibers, such as glass fibers, in addition to microballoons, also referred to as hollow microspheres, of glass or other material employed to impart a cellular structure to the foam. Example 1 of this patent demonstrates the requirement for a conventional flame retarding agent. When the flame retarding additive was omitted, the limiting oxygen index, which is directly proportional to the flame retarding ability of the material, decreases from 80% oxygen to 17% oxygen.

As used in the context of many of the aforementioned patents, the term "flame retarding" refers to materials which are self-extinguishing, in that they continue to burn for at most a limited amount of time, if at all, once the flame used to ignite the foam sample is removed. A frequently employed test method to evaluate this type of flame retardancy for polymeric materials is "The Standard For Tests For Flammability of Plastic Materials for Parts in Devices and Appliances, UL94," published on June 1, 1973, by Underwriters' Laboratories, Inc. In accordance with this procedure, a sample is contacted with a gas-fired flame from a bunsen burner for 60 seconds. The flame is then removed from the area of the sample and the time required for the burning sample to extinguish itself is measured. The aforementioned patent to Smith reports that the foam prepared using the formulation described in Example 1 of this patent burned for less than 2 seconds after the flame was removed and the length of the sample that burned was less than 1.27 cm. This test provides no indication of how long it will take for a flame applied against one surface of a relatively thick foam sample to reach the opposite side of the foam.

A test method that provides an indication as to whether a material is sufficiently flame retardant to form an effective penetration seal is described in ASTM test method E-119, published by the American Society for Testing of Materials. In accordance with this test, a surface of the sample of material to be evaluated is contacted with an open flame and the time required for the flame to burn through a specified thickness of the sample is measured.

Hitchcock, in U.S. Pat. No. 4,259,455, issued on Mar. 3, 1981, teaches the use of fibrous aluminum silicate to prepare polysiloxane foams which pass the ASTM E-119 test by being able to withstand flame temperatures of up to 2000° F. (1090° C.) for three hours without burning through. In addition to a fibrous aluminum silicate, the reaction mixtures also contain an organohydrogensiloxane, a hydroxyl-containing organosiloxane and a platinum catalyst. Hitchcock states that foams prepared using fibrous aluminum silicates require a thickness of from five to six inches (13–15 cm.) to pass the aforementioned ASTM El-119 test whereas prior art foams, including those disclosed in the aforementioned U.S. Pat. No. 3,923,705, to Smith, must be from 9 to 12 inches (24–30 cm.) thick to pass this test.

It has now been found that polysiloxane foams exhibiting a greater resistance to burning through than has heretofore been possible using prior art methods and materials can be prepared by incorporating into the cured foam effective amounts of finely divided fibrous and cellular forms of heat resistant, nonmetallic materials such as glass that do not soften or decompose below about 2000° C., and platinum in elementary or chemically combined form.

SUMMARY OF THE INVENTION

Cured polyorganosiloxane foams exhibiting a uniquely high resistance to burn-through and disintegration when exposed to flames contain at least 0.1% by weight each, based on the weight of said foam, of at least one finely divided nonmetallic fibrous heat resistant material, at least one finely divided nonmetallic, cellular heat resistant material, and at least 5 ppm of platinum as elemental or chemically combined platinum. The total concentration of heat resistant materials should not exceed 40%, based on the weight of the foam. In accordance with a preferred method for preparing the foam, an organohydrogensiloxane containing at least three silicon-bonded hydrogen atoms per molecule is reacted with a hydroxyl compound selected from water, silanols, and siloxanols, and at least one polydiorganosiloxane that contains at least two silicon-bonded vinyl groups, two silicon-bonded hydroxyl groups or combinations thereof. The reaction is conducted in the presence of a dispersed or solubilized platinum-containing catalyst and at least 0.1% by each, based on the weight of the final foams, of finely divided fibrous and cellular forms of nonmetallic heat resistant materials.

DETAILED DESCRIPTION OF THE INVENTION

This invention provides a cured, flame retardant polyorganosiloxane foam comprising a matrix of cured, cellular polyorganosiloxane containing a uniformly dispersed mixture comprising
(1) at least five parts by weight per million parts by weight of said foam of platinum in elemental or chemically combined form,
(2) at least 0.1%, based on the weight of said foam, of at least one finely divided noncellular, nonmetallic, fibrous heat resistant material,
(3) at least 0.1% based on the weight of said foam, of at least one finely divided non-metallic cellular heat resistant material, wherein
the combined concentrations of fibrous and cellular heat resistant materials do not exceed 40% of the total weight of said foam and the heat resistant materials do not soften or decompose below 1500° C.

This invention also provides a preferred method for preparing flame retardant, room temperature curable polyorganosiloxane foams, said method comprising
(I) forming a homogeneous reactive composition by blending together
(A) at least one organohydrogensiloxane containing at least three silicon-bonded hydrogen atoms per molecule and an average of no more than one hydrogen atom per silicon atom,
(B) at least one hydroxyl compound selected from the group consisting of silanols, siloxanols, and water,
(C) at least one polydiorganosiloxane selected from the group consisting of hydroxyl-containing polydiorganosiloxanes and triorganopolysiloxy-endblocked polydiorganosiloxanes containing an average of at least two silicon-bonded vinyl groups per molecule, the concentration of said polydiorganosiloxane being such that the viscosity of the reactive composition is within the range of from 0.1 to 100 Pa·s, measured at 25° C., wherein the organic groups bonded to the silicon atoms of the organohydrogensiloxane, silanol, siloxanol, and polydiorganosiloxane are selected from the group consisting of alkyl containing from 1 to 6 carbon atoms, cycloalkyl containing from 3 to 6 carbon atoms, vinyl, phenyl, and 3,3,3-trifluoropropyl, and any hydroxyl-containing polydiorganosiloxane constitutes at least a portion of (B),
(1) at least five parts by weight per million parts by weight of said reactive composition of platinum in elemental or chemically combined form,
(2) at least 0.1% based on the weight of said reactive composition, of at least one finely divided nonmetallic, fibrous heat resistant material,
(3) at least 0.1%, based on the weight of said reactive composition of at least one finely divided nonmetallic, cellular heat resistant material, wherein the combined concentrations of fibrous and cellular heat resistant materials do not exceed 40 weight %, based on the remaining components of said reactive composition, and said heat resistant materials exhibit a softening point above 1500° C., and
(II) allowing said reactive composition to form a cured polyorganosiloxane foam exhibiting an increased resistance to burn-through relative to polyorganosiloxane foams prepared using a fibrous or a cellular heat resistant material.

In accordance with a preferred embodiment of the present method, at least one organohydrogensiloxane, at least one polydiorganosiloxane having an average of at least two silicon-bonded hydroxyl groups, and at least one triorganosiloxy-endblocked polydiorganosiloxane having at least two silicon-bonded vinyl groups per molecule are mixed together and allowed to react in the presence of a compatible platinum-containing catalyst and fibrous and cellular forms of heat resistant materials as set forth in this specification. The siloxanes and the platinum catalyst are those conventionally used to prepare polyorganosiloxane foams, and will be discussed in greater detail in a subsequent portion of this specification. The unique burn-through resistance that distinguishes foams prepared using the method of this invention from prior art polyorganosiloxane foams results from the presence of both fibrous and cellular forms of finely divided, nonmetallic, heat resistant materials.

The materials which constitute the heat resistant fibrous and cellular materials of this invention are members of the class referred to in the art as "refractory materials." The definition of the term "heat resistant" as applied to the fibrous and particulate materials of the present invention is therefore synonymous with this term as applied to refractory materials. The Kirk-Othmer Encyclopedia of Chemical Technology (second edition, volume 17, published by Interscience Publishers, New York, N.Y.) describes refractory materials as having "softening points well above 1500° C."

Finely divided fibrous forms of silicate glass and other refractory materials, including certain oxides, carbides, and silicates are well known in the art and are commercially available in the form of whiskers, monofilaments, and yarns. For ease of processability during mixing and application of the foam-forming ingredients used in the present invention, the fibers should be less than 20 microns in diameter and less than 50 mm long. Dispersing of the fibers in the foam-forming reactants of this invention is facilitated if the fibers are from 2 to 8 mm long and from 5 to 20 microns in diameter. Most preferably the fibers are about 6 mm long.

Fibrous heat resistant materials that are suitable for preparing foams in accordance with this invention include naturally occurring materials, such as asbestos, and man-made fibers and whiskers formed from glass, carbon, alumina, inorganic silicates such as aluminum silicate and mixtures of aluminum silicate with alkali metal and/or alkaline earth metal silicates. Preferred fibrous heat resistant materials are glass and carbon. Methods for forming fibers from these and other suitable refractory materials are well known in the art.

The cellular particulate material used in the present foams can be hollow glass microspheres or any of the low density cellular particulate refractory materials such as perlite and vermiculite that are commonly employed as packing material and insulation. The density of the cellular material is usually less than 0.5 g. per $cm^3$, preferably less than 0.3 g. per $cm^3$. To avoid processing difficulties when mixing and dispersing the foam-forming reaction mixture, the particles are preferably no larger than 0.3 cm. in diameter.

It has been found that the rate at which a flame burns through a foam of this invention, expressed as length of flame travel per unit time, gradually decreases as the concentrations of fibrous and cellular heat resistant materials are increased. In the absence of other factors, it would therefore be desirable to use the highest concentrations of these materials that the foamable composition will accommodate. This is particularly true for those heat resistant materials that are less expensive than the organosilicon compounds used as the foam-forming reactants. In practice this ideal usually cannot be achieved. Since, in most instances, the viscosity of the foamable composition also varies directly with filler content, it is usually not feasible to prepare useful foamable compositions containing more than about 20% by weight each of fibrous and cellular heat resistant materials. A compromise must usually be reached between the ultimate level of flame retardancy that can be achieved and the optimum viscosity for a particular end-use application. Preferably the concentrations of fibrous and cellular heat resistant materials are each from 1 to 10% by weight. If the foamable composition contains much more than about 10% by weight of certain fibers such as glass, some difficulty in mixing and transferring the composition may be experienced. These difficulties are believed due to intertwining of the fibrous heat resistant material, which can impart a "stringy" or "ropey" texture to the foamable composition.

It has been found that in some instances using more than 5% by weight of hollow glass microspheres yields no appreciable decrease in burn-through rate, expressed as the length of flame travel per unit time, of a cured polyorganosiloxane foam. In fact this rate may even increase slightly.

If the foamable compositions of this invention are intended to be poured into a mold or other cavity, they should be capable of flowing under their own weight. Compositions with a viscosity lower than 100 Pa·s at 25° C. will usually exhibit a practical rate of flow at ambient temperature. Most preferably the viscosity of the mixture is less than about 25 Pa·s at 25° C. If the composition is to be transferred by pumping the viscosity is desirably from 0.1 to about 10 Pa·s at 25° C.

Compositions employed to prepare polysiloxane foams in accordance with the present method can be in the form of a paste or thick slurry that is applied by troweling or other suitable means to surfaces to protect the surfaces from flames or heat.

The organohydrogensiloxane, component (A) used to prepare foams in accordance with the preferred method of this invention can be any siloxane having an average of at least three silicon-bonded hydrogen atoms per molecule and an average of no more than one silicon-bonded hydrogen atom per silicon atom. The remaining valences of the silicon atoms are satisfied by oxygen or by monovalent hydrocarbyl radicals containing one to six carbon atoms, such as methyl, ethyl, propyl, isopropyl, butyl, tertiary butyl, pentyl, hexyl, cyclohexyl, phenyl, and 3,3,3-trifluoropropyl radicals. Component (A) may contain one or more homopolymer, copolymer or mixture thereof which, in turn, are composed of siloxane units of the following types:

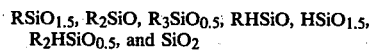
$RSiO_{1.5}$, $R_2SiO$, $R_3SiO_{0.5}$, $RHSiO$, $HSiO_{1.5}$, $R_2HSiO_{0.5}$, and $SiO_2$ where R is one of the monovalent hydrocarbyl radicals defined above. Preferably R is methyl, phenyl, or 3,3,3-trifluoropropyl, this preference being based on the availability of the reagents, usually halosilanes, typically employed to prepare the foam-forming reactants.

Some specific examples of component (A) include cyclic polymethylhydrogensiloxanes, copolymers having trimethylsiloxy and methylhydrogensiloxane units, copolymers having dimethylhydrogensiloxy and methylhydrogensiloxane units, copolymers having trimethylsiloxy, dimethylsiloxane and methylhydrogensiloxane units, and copolymers having dimethylhydrogensiloxane, dimethylsiloxane and methylhydrogensiloxane units. Preferably, the constituents of component (A) contain an average of at least five silicon-bonded hydrogen atoms per molecule.

The hydroxyl-containing portion, component (B), of the foamable compositions of this invention can be water or a silane or siloxane containing an average of from 1.0 to 2.5 silicon-bonded hydroxyl groups per molecule. The hydrocarbon radicals bonded to the silicon atoms of these silanes and siloxanes can be any of those previously disclosed in connection with (A). In addition, the hydroxyl-containing organosilicon compound may contain one or more alkenyl groups, such as vinyl groups, per molecule.

The hydroxyl-containing silane or siloxane portion of component (B) may consist of one or more homopolymer, copolymer, or a mixture of homopolymer and copolymer. Component (B) may contain polyorganosiloxane species of varying molecular weight and hydroxyl content, so long as the average hydroxyl content is within the aforementioned range of from 1.0 to 2.5 hydroxyl groups per molecule, and each silicon atom is bonded to at least one hydrocarbon radical. Typical hydroxylated organosiloxanes include hydroxyl endblocked polydimethylsiloxanes, hydroxyl endblocked polydiorganosiloxanes having siloxane units of dimethylsiloxane and phenylmethylsiloxane, hydroxyl endblocked polymethyl-3,3,3-trifluoropropylsiloxanes, and hydroxyl endblocked polyorganosiloxanes having siloxane units of monomethylsiloxane, dimethylsiloxane, monophenylsiloxane, and diphenylsiloxane.

The hydroxyl-containing siloxanes can be used in combination with hydroxyl-containing silanes such as diphenylmethylsilanol. As long as some hydroxylated organosiloxane polymer having two or more hydroxyl groups per molecule forms a part of component (B), hydroxylated silanes containing an average of from 1.0 up to 2.5 silicon-bonded hydroxyl groups per molecule.

To ensure preparation of acceptable room temperature curable polyorganosiloxane foams, the foamable composition should contain an effective amount of at least one polydiorganosiloxane, component (C), that exhibits a viscosity in the range of from 0.1 to 100 Pa·s at 25° C. and contains an average of at least two groups per molecule selected from silicon-bonded hydroxyl and silicon-bonded vinyl groups. If component (C) contains two or more silicon-bonded hydroxyl groups per molecule, it can also function as at least a portion of component (B). Alternatively, (C) may contain an average of two or more silicon-bonded vinyl groups per molecule. The present invention demonstrates that inclusion of vinyl-containing siloxanes in (C) improves the physical properties, such as tensile strength and resiliency exhibited by the cured foam. These siloxanes are discussed in greater detail in this specification.

In addition to providing hydroxyl and/or vinyl groups to react with the silicon-bonded hydrogen atoms during formation of the polyorganosiloxane foam, (C), in combination with the other components of the foamable composition, yields a composition that is sufficiently viscous to produce a foam of the desired density by entrapping the required amount of hydrogen generated by reaction of the silicon-bonded hydrogen atoms with the hydroxyl compound(s) present in the foamable composition. The hydrogen should be entrapped while the foamable composition is sufficiently fluid to expand. If the viscosity to too low during hydrogen generation, much of the hydrogen will escape. If the composition polymerizes too rapidly, it may cure to a solid material before sufficient hydrogen has been evolved to form the desired cellular structure. Including polydiorganosiloxane (C) in an amount such that the reaction mixture exhibits a viscosity of at least 0.1 Pa·s at 25° C. usually ensures that the foamable composition will entrap enough hydrogen to produce an elastomeric foam.

As previously disclosed, the foamable composition may contain water as at least a portion of (B). The use of water as a blowing agent for polysiloxane foams is taught in U.S. Pat. No. 4,189,545, which issued on Feb. 19, 1980. This patent discloses that water reacts with the organohydrogensiloxane to generate bubbles of hydrogen gas which are entrapped within the viscous polymerizing siloxane reaction mixture. The concentration of water is from 100 to about 15,000 p.p.m., based on the weight of the total composition, and the amount of organohydrogen siloxane present should be adjusted accordingly.

If water is the only hydroxyl compound present, the foamable composition must also contain a benzene soluble polydiorganosiloxane with silicon-bonded vinyl groups in an amount that will impart a viscosity of greater than 0.1 Pa·s, measured at 25° C., to the reaction mixture. Foamable compositions comprising a vinyl-containing polydiorganosiloxane, water, a organohydrogensiloxane and a platinum catalyst are disclosed in the aforementioned U.S. Pat. No. 4,189,545. This patent is hereby incorporated in its entirety by reference to show one type of foamable polyorganosiloxane composition that can be employed in combination with finely divided fibrous and cellular heat resistant materials to prepare fire retardant foams in accordance with the present method.

The strength of cured polyorganosiloxane foams prepared in accordance with the present method using a hydroxylated silane or siloxane can be increased by including as at least a portion of (C) one or more of the aforementioned benzene soluble vinyl-containing triorganosiloxy terminated polydiorganosiloxanes having an average of about two vinyl groups per molecule in amounts up to 85 percent, preferably up to 50 percent, based on the total weight of the vinyl-containing triorganosiloxy terminated polydiorganosiloxane and the hydroxyl-containing silane or siloxane. Most preferably the vinyl-containing polydiorganosiloxane portion of (C) constitutes from 20 to 40% of the combined weight of polydiorganosiloxane and hydroxylated organosilicon compound. The vinyl groups of the polydiorganosiloxane are preferably present as terminal diorganovinylsiloxy groups and the remaining hydrocarbon groups in the molecule are as previously defined for the substituent R.

The vinyl-containing polydiorganosiloxane portion of (C) can be a mixture of a single species. Examples of these types of polymers are widely shown in the prior art such as in U.S. Pat. No. 3,445,420 and U.S. Pat. No. 3,453,234, both which are hereby incorporated by reference to show vinyl-containing triorganosiloxy terminated polydiorganosiloxanes.

If no vinyl-containing polydiorganosiloxanes are present in (C), the relative concentrations of (A) and hydroxyl-containing organosilicon compound(s) are sufficient to provide a molar ratio of silicon-bonded hydrogen atoms to silicon-bonded hydroxyl groups of from 2.5 to 40, preferably from 4 to 10. Ratios of less than 2.5 provide foams that are too friable and weak to be useful in the known applications. The same problem exists above the upper limit. Within this range of molar ratios, the foam density will decrease as the ratio increases if other variables remain constant.

If (C) includes one or more vinyl-containing polydiorganosiloxanes, the molar ratio of silicon-bonded hydrogen atoms to silicon-bonded hydroxyl groups can be varied over a range of from 0.5 to 40. It is not fully understood why this ratio can be varied more broadly with these ingredients, however, the reactions of such mixtures are complex and have not been fully studied.

When water is used as (B) of the present foamable compositions, U.S. Pat. No. 4,189,545 teaches that the molar ratio of silicon-bonded hydrogen atoms to water should be at least 0.2.

The molecular weight of any particular ingredient is not significant, providing that it is compatible or dispersible in the total reaction mixture, and the final composition exhibits a viscosity within the range defined in this specification.

In accordance with the method of this invention, components (A), (B), and (C) are reacted in the presence of a platinum-containing catalyst, component (1). The catalyst can be any of the platinum catalysts conventionally employed for the reaction of hydroxyl groups with silicon-bonded hydrogen atoms, and can range from platinum metal deposited on suitable carriers such as silica gel or powdered charcoal, to platinic chloride, salts of platinum, and chloroplatinic acid. Any of these forms will function in the instant curing system, providing that it is soluble or readily dispersible as minute particles in the reaction mixture. If a clear or colorless foam is desired, (1) is preferably chloroplatinic acid, which is available as the hexahydrate or in anhydrous form. Another preferred platinum-containing catalyst is a chloroplatinic acid catalyst complex prepared by the method described in U.S. Pat. No. 3,419,593 which is hereby incorporated by reference. An example of a complex is one prepared by mixing chloroplatinic acid hexahydrate with symetrical divinyltetramethyldisiloxane, optionally in the presence of an alcohol as a solvent. Additional examples of (1) catalysts include, among others,

platinum bromide, a complex of a platinous halide with an olefin such as ethylene, propylene, butylene, cyclohexene, or styrene, and other complexes disclosed in the aforementioned U.S. Pat. No. 3,923,705 to Smith, which is hereby incorporated in its entirety by reference.

Component (1) can be present in an amount sufficient to provide from 5 to 200 parts by weight of platinum per one million parts by weight of foamable and curable composition (p.p.m.). Preferably, (1) is present in amounts to provide from 10 to 50 p.p.m. platinum. Catalyst concentrations which provide less than 5 p.p.m. of platinum usually will not result in acceptable foam formation and concentrations equivalent to more than 200 p.p.m. of platinum are uneconomical and may make the composition too reactive. Higher concentrations of catalyst should be used with a platinum catalyst inhibitor, since the rates of the foaming and curing reactions increase with increasing platinum concentration. If these rates are too rapid, foaming and curing can occur prematurely as the reactants are being mixed and before the resultant mixture has been transported to the location where the foam is to be formed.

If it is desired to increase the time interval between combining of the siloxane reactant and initiation of the foaming reaction (also known as "pot life") without decreasing the concentration of platinum catalyst, this can be achieved using one of the known platinum catalyst inhibitors such as cyclic polymethylvinylsiloxanes and the acetylenic compounds such as 3-methyl-1-butyn-3-ol that are disclosed in U.S. Pat. No. 3,445,420, which issued on May 20, 1969, and is hereby incorporated by reference. Inhibitors are usually employed at relatively low concentration levels. For example, cyclic polymethylvinylsiloxanes are used as concentrations below 2%, based on the weight of reactants employed to prepare the foams.

In addition to the fibrous and cellular heat resistant materials, the foamable and curable compositions of this invention can contain finely divided fillers of the reinforcing and extending type. Useful fillers include fume silica, diatomaceous earth, iron oxide, carbon black, zinc oxide, calcium carbonate, and ground quartz. Carbon black, ground quartz, and zinc oxide are preferred fillers. The viscosity of the foamable composition will usually increase in direct proportion to the amount of heat-resistant materials and fillers in the composition.

The cured polyorganosiloxane foams of the present invention have excellent fire retardant properties. For some applications it is desirable to further increase fire retardancy by adding from 0.01 to 2% by weight preferably from 0.05 to 1% of carbon black based on the total weight of the foamable and curable composition. A preferred form of carbon black is lamp black.

In accordance with the method of this invention, the hydroxyl-containing organosilane, organohydrogensiloxane, catalyst, heat resistant materials, and vinyl-containing polydiorganosiloxanes, and other additives, are mixed together at room temperature until a homogeneous composition is obtained. The resultant foamable and curable composition will react to form a cured foam at ambient temperature. The mixing should be completed and the resultant foamable and curable composition transferred to the desired location before foaming and curing of the mixture has progressed to any significant extent.

The ingredients that constitute the foamable and curable compositions of this invention can be combined in any manner. For example, the organohydrogensiloxane can be mixed with the platinum catalyst and then mixed with the hydroxyl compound and heat resistant materials or the platinum catalyst can be mixed with the hydroxyl compound and then mixed with the organohydrogensiloxane and heat resistant materials. Other methods of mixing are also suitable, such as dividing the hydroxylated organosiloxane into two proportions mixing one proportion together with the platinum catalyst, mixing the other proportion with the organohydrogensiloxane and heat resistant materials and then the two mixtures are combined to form a foam. Additionally, the various optional ingredients can be mixed with one or more of the required ingredients in any manner as long as a reaction does not begin prematurely before all the ingredients are uniformly blended. If the reactants are to be stored prior to use, the organohydrogensiloxane and the platinum catalyst should not be present in the same container because they may react to generate hydrogen gas.

Generation of hydrogen gas may also result from the presence of acidic materials in that portion of the reaction mixture containing the organohydrogensiloxane. Since some types of heat resistant materials may contain acidic impurities, it is preferably that these materials not be combined with the organohydrogensiloxane until it is desired to prepare a foam.

The ingredients of the present foamable compositions should be sufficiently mixed to form a homogeneous material. This will ensure that the final cured foam is substantially free of splits and large void areas. The type and duration of mixing will affect foam properties such as cell size and density. High speed or high shear mixing should be avoided if possible, since it often introduces air bubbles into the foamable composition.

Because processing equipment and reaction conditions such as catalyst concentration, mixing time, reactivity of reagents, shear rate, and desired pot life (the time between initial combining of the reactants and initiation of the foaming reaction) can vary so widely, it is difficult if not impossible to define a single set of limits for reaction conditions that will encompass all of these variables and ensure preparation of a useful foam. The reaction conditions best suited to prepare useful foams from a given combination of reactants and catalysts can readily be determined with a minimum of experimentation by those skilled in the art.

In some instances the foaming reaction may be difficult to initiate at ambient temperature. This may be due to the relatively high concentration of inhibitors required to achieve the desired "pot life" or a relatively low catalyst concentration. If it is desired to shorten the time required for the foaming reaction to initiate and/or reach completion, this can conveniently be accomplished by mildly heating the foamable and curable composition.

The polyorganosiloxane foams of this invention are elastomeric and exhibit predominantly a closed cell structure. The densities of these foams range from about 0.1 to about 1.0 gram per cubic centimeter, depending upon the types and amounts of heat resistant materials and reactants employed to prepare the foam. The cured foams range in color from white to black depending upon the amount and types of ingredients. One type of preferred foam is dark grey or black due to the presence of carbon black as an auxiliary flame retarding agent.

The polyorganosiloxane foams of this invention are unique in that the burn-through rate, expressed as length of flame travel per unit time is considerably lower than the rate for prior art polyorganosiloxane foams such as those disclosed in the aforementioned U.S. Pat. Nos. 3,923,705 and 4,259,455. In addition to a lower burn-through rate, the increase in flame retardancy achieved by a given increase in foam thickness is often substantially greater than can be by an equal increase in the thickness of prior art foams. For example, whereas the time required for a flame to penetrate a prior art foam (referred to as burn-through time) may increase from 2.0 to 13.0 minutes (a factor of 6.5) when the thickness of the foam sample is increased by a factor of 5.6 (from 0.89 to 2.5 cm.), the burn-through time of a foam prepared using the same foamable composition but containing 2½% by weight of glass fibers and 5% by weight of glass microspheres increases by a factor of 9.3 (from 12 to 112 minutes) for an identical increase in thickness (from 0.89 to 2.5 cm.). This phenomenon is directly contrary to what one would expect, based on the effect observed for conventional flame retardants.

Foams prepared in accordance with the method of this invention are useful in numerous applications where it is desired to produce a flame retardant seal that is impervious to most vapors and liquids, particularly smoke and water. Examples of such applications include penetration seals in walls and floors of buildings.

Liquid foamable and curable compositions prepared in accordance with the present method can be transferred to the passage or other location to be filled with foam and subsequently allowed to react. The composition can be transferred to the reaction site by any suitable means, including pouring, pumping, and spraying.

In accordance with a preferred method, the reactive composition employed to prepare the foam is stored as two separate components. When it is desired to prepare a foam the components are pumped from their containers into a mixing chamber and thoroughly blended immediately prior to being dispensed at the location where the foam is to be formed.

If it is not convenient to form a foam at the location where it is to be installed, a cured foam can be prepared elsewhere and cut to the required dimensions. If the foam is to be compressively fit into a passage, a foamable, curable compositions of this invention is reacted in a mold with slightly larger dimensions than those of the passage. The cured plug is then compressed, as for example in a rigid tube, and forced into the passage by suitable means, such as by pneumatic or hydraulic pressure. Alternatively, a foam can be prepared in a suitable casing such as a corrugated pipe. The pip containing the cured foam is then cut to the desired length and incorporated into a partition as the partition is being constructed. Such a method for installing foam type fire seals in concrete walls is disclosed in U.S. Pat. No. 4,302,917, to Fermvik et al., which issued on Dec. 1, 1981. This patent is hereby incorporated in its entirety by reference. Once the preformed foam plug is in place, the desired cables, conduits, or other articles are forced through the foam, which is sufficiently resilient to form a compressive seal around the article. A method for passing conduits through a foam seal is disclosed by Fermvik et al.

The level of flame retardancy imparted to foam samples by a given additive can be determined using a variation of a flame penetration test developed by the United States Bureau of Mines. The samples to be evaluated are prepared by pouring a foamable reaction mixture into a square mold at the bottom of which is a circular sheet of filter paper measuring 4.3 inches (11 cm.) in diameter. The sides of the mold are three inches (7.5 cm.) long and 0.5 inch (1.3 cm.) high. After the foamable reaction mixture is poured into the mold, a sheet of metal is placed on top of the mold to contain the resultant foam within the confines of the mold. The cured foam samples, which have the aforementioned sheet of filter paper adhered to one surface, are then placed, paper side up, on top of a horizontally aligned sheet of Transite ® (a cement-asbestos composite material manufactured by the Johns-Manville Corporation) such that the foam completely covers a 1.5 inch (3.8 cm)-diameter hole in the Transite sheet. A gas fired flame issuing from a 0.25 inch (0.64 cm.)-diameter burner orifice is directed against the exposed portion of the lower surface of the foam sample such that the apex of the central portion of the flame (a blue cone) is adjacent to the surface of the foam. This point is located about 0.5 inch (1.3 cm.) from the burner orifice. The flame temperature at this location is believed to be within the range from 1760° to 1930° C. The flame is maintained at the same location until there is evidence of glowing combustion of the filter paper. The time interval between initial application of the flame and the first indication of glowing combustion of the filter paper or upper surface of the foam is designated as the "burn-through time."

The following examples are provided to illustrate preferred embodiments and should not be interpreted as limiting the scope of the invention defined in the accompanying claims. All parts and percentages are by weight unless otherwise specified.

EXAMPLE 1

This example demonstrates the unexpectedly large improvement in flame retardancy achieved using the combination of glass fibers and hollow glass microspheres.

The ingredients that were combined to prepare the foamable and curable compositions included 97.4 parts of a dimethylhydroxysiloxy terminated polydimethylsiloxane having a viscosity of 13.5 Pa·s at 25° C.; 34.5 parts of a dimethylvinylsiloxy terminated polydimethylsiloxane having a viscosity of about 12.5 Pa·s at 25° C.; 31.1 parts of ground quartz having an average particle size of 5 microns; 0.34 part of lamp black; 0.68 part zinc oxide; 0.45 part of a complex derived from chloroplatinic acid and symmetrical tetramethyldivinyldisiloxane and containing 0.65% of platinum; 11.0 parts of a dimethylhydroxysiloxy terminated polydimethylsiloxane containing about 3.3% of hydroxyl groups and having a viscosity of 0.04 Pa·s; 8.3 parts of a trimethylsiloxy terminated polymethylhydrogensiloxane containing 1.6% of silicon-bonded hydrogen atoms; 2.1 parts of a trimethylsiloxy terminated polyorganosiloxane containing 37.5 mole % of dimethylsiloxane units and 62.5 mole % of methylhydrogensiloxane units, these percentages being exclusive of the terminal trimethylsiloxy units, and about 0.7% of silicon-bonded hydrogen atoms; and 0.1 part of cyclic methylvinylsiloxanes.

Polysiloxane foam samples were prepared using 100 parts of the foregoing formulation in addition to the types and amounts of heat resistant materials specified in Table 1. This table also lists the thickness and burn-through time of each sample. Burn-through time is the time interval, in minutes and seconds, required for a flame to burn through the sample, as determined using the previously described variation of the U.S. Bureau of Mines test. Of the four samples in the table, only one (Sample D) contained the combination of fibrous and cellular heat resistant materials at concentration levels that characterize the polyorganosiloxane foams of this invention.

TABLE 1

| Sample | Additive (parts) | Sample Thickness (cm.) | Burn-Through Time Min. | Sec. |
|---|---|---|---|---|
| A (control) | None | 1.0 | 2 | 6 |
| B (control) | Glass fibers[1] (2.5) | 0.72 | 3 | 10 |
| C (control) | Glass microspheres[2] (5) | 1.0 | 3 | 45 |
| D (present invention) | Glass fibers (2.5) Glass microspheres (5) | 0.89 | 10 | 22 |

[1] 0.25 in. (0.63 cm.) in length, manufactured by H. I. Thompson Fiber Glass Corporation
[2] Type B-25, manufactured by Minnesota Mining and Manufacturing Company Sample D, a foam prepared in accordance with the present invention, contained the same concentration of glass fibers as control B and the same concentration of hollow microspheres as control C, yet exhibited nearly 3 times the burn-through time, relative to the thicker of the two control samples, control C, even though the thickness of sample D was only 89% that of control C. This is contrary to what one would expect based on the relative thickness of the two samples and the additive effect expected from two flame retarding materials.

EXAMPLE 2

This example compares the flame retardancy of a foam sample prepared according to the present method with the flame retardancy of a sample containing only fibrous aluminum silicate.

A polyorganosiloxane foam was prepared as described in the examples of U.S. Pat. No. 4,259,455. Equal weights of parts A & B of a polyorganosiloxane foam composition available as Dow Corning ® 3-6548 silicone RTV foam were combined with 33%, based on the weight of the total composition, of aluminum silicate fibers sold by the Carborundum Company under the trade name Fiberfrax ®. The thickness of the final cured foam was 0.47 inch (1.19 cm.). The burn-through time of the foam, determined using the previously described modified Bureau of Mines testing procedure, was 3 minutes and 34 seconds. By comparison, a 0.5 inch (1.25 cm.)-thick foam prepared using the same Dow Corning composition with 2.5% of 0.25 inch (0.63 cm.)-long glass fibers and 5.0% of hollow glass microspheres, available from the Emerson Cuming Company, exhibited a burn-through time of 22 minutes and 37 seconds. The combined weight of the glass fibers and microspheres amounted to only 7.0% of the weight of the total form. By comparison, the prior art foam, which contained 33% by weight of aluminum silicate fibers, exhibited a burn-through time of only 3 minutes and 34 seconds.

EXAMPLE 3

This example demonstrates the utility of various combinations of heat resistant fibrous and cellular materials as flame retardants for polyorganosiloxane foams. Room temperature vulcanizable foam samples were prepared as described in the preceding Example 1 and contained the refractory materials listed in Table 2.

The fibrous heat resistant materials employed included 0.25 inch (0.64 cm.)-long carbon fibers manufactured by H. I. Thompson Fiberglass Corporation and 0.25 inch (0.64 cm.)-long glass fibers from the same manufacturer. The cellular heat resistant materials included perlite (available as Ryolex ® Perlite 40-C from the Silbrico Corporation) and hollow glass microspheres available as type B-25-B from the Minnesota Mining and Manufacturing Company and exhibiting an average diameter of 25 microns.

The data from samples A and D in Table 1 are repeated in Table 2 to demonstrate the relationship between sample thickness and burn-through time. Comparing sample D with sample F, both of which contained the same type and concentration of flame retarding agents, an increase in thickness of 0.67 cm. (from 0.89 to 1.56 cm.) resulted in an increase of 39.5 minutes in the burn-through time. By comparison, the burn-through time of a control foam that did not contain any heat resistant materials increased by only 18.5 minutes when the thickness increased by 2.8 cm. Expressed another way, the increase in burn-through time achieved by a given increase in thickness ($\nabla$ burn-through time/$\nabla$ thickness) is considerably greater for a foam of this invention (39.5/0.67=59 min./cm.) than for an unmodified control (18.5/2.8=6.6 min./cm.).

A comparison of the data from sample I and control sample O demonstrates that for samples of comparable thickness, 10% of perlite imparts less resistance to burn-through (13 minutes) than a combination of 2.5% of glass fibers and 5.0% of perlite (greater than 150 minutes).

TABLE 2

| Sample | Thickness (cm.) | Fibrous Particles (%) | Cellular Particles (%) | Burn-Through Time Minutes | Seconds |
|---|---|---|---|---|---|
| E | 1.33 | Glass (1.25) | Glass Microspheres (5.0) | 9 | 5 |
| F | 1.56 | Glass (2.5) | Glass Microspheres (5.0) | 49 | 50 |
| G | 1.70 | Glass (5.0) | Glass Microspheres (5.0) | 120[1] | — |
| H | 1.71 | Glass (2.5) | Perlite (2.5) | 200[1] | — |
| I | 1.56 | Glass (2.5) | Perlite (5.0) | 150[1] | — |
| J | 1.60 | Carbon (2.5) | Perlite (5.0) | 90 | 31 |
| K | 0.86 | Carbon (2.5) | Glass Microspheres (5.0) | 11 | 50 |
| D (from Ex. 1) | 0.89 | Glass (2.5) | Glass Microspheres (5.0) | 10 | 22 |
| L | 1.0 | Glass (2.5) | Glass Microspheres (7.5) | 9 | 37 |
| M (control) | 3.8 | None | None | 20 | 35 |
| A (Ex. 1 control) | 1.0 | None | None | 2 | 6 |
| N (control) | 1.54 | None | Perlite (5.0) | 7 | 1 |

TABLE 2-continued

| Sample | Thickness (cm.) | Fibrous Particles (%) | Cellular Particles (%) | Burn-Through Time Minutes | Seconds |
|---|---|---|---|---|---|
| O (control) | 1.60 | None | Perlite (10.0) | 12 | 43 |

[1]Testing discontinued when no burn-through occurred after indicated exposure time.

EXAMPLE 4

This example demonstrates the relationship between sample thickness and burn-through time for polyorganosiloxane foams containing heat resistant fibrous and cellular particles, and unmodified polyorganosiloxane foams.

Foam samples were prepared and tested for flame retardancy as described in the preceding Example 1. The foams prepared in accordance with the present method contained 2.5% of the glass fibers and 5% of the hollow glass microspheres described in Example 1. The control foams did not contain any fibers or microspheres.

The thickness of the various foam samples and the burn-through times are recorded in the following Table 3.

TABLE 3

| Sample Thickness (centimeters) | Burn-Through Time (minutes) |
|---|---|
| Controls (No fibers or particles) | |
| 0.48 | 1.0 |
| 0.89 | 2.0 |
| 2.5 | 13.0 |
| 5.0 | 30.0 |
| Foams with 2½% fibers and 5% microspheres (Present Invention) | |
| 0.89 | 12 |
| 1.5 | 48 |
| 2.5 | 112 |

When the thickness of the control samples was increased by a factor of 5, from 0.48 to 2.5 cm., the burn-through time increased by a factor of 3 (from 1 to 3 minutes), equivalent to a value for $\nabla$ burn-through time/$\nabla$ thickness of 3/5, or 0.6. An additional increase in thickness by a factor of 2 (from 2.5 to 5.0 cm.) yielded a 2.3-fold increase in burn-through resistance time (from 13 to 30 minutes), equivalent to a $\nabla$ burn-through time/$\nabla$ thickness of 2.3/2 or 1.2. By comparison, a foam of this invention containing glass fibers and microspheres exhibited a 3.3-fold increase in burn-through time (from 12 to 40 minutes) when the sample thickness was increased by a factor of 1.7 (from 0.89 and 1.5 cm.), equivalent to a $\nabla$ burn-through time/$\nabla$ thickness of 3.3/1.7 or 1.9. An additional 2.8-fold increase in thickness, from 0.89 to 2.5 cm., resulted in a 9.3-fold increase in burn-through time, equivalent to a $\nabla$ burn-through time/$\nabla$ thickness of 9.3/2.8 or 3.3.

The foregoing data demonstrate that a relatively small increase in the thickness of foams prepared in accordance with this invention yields a considerably larger increase in flame retardancy, as measured using burn-through time, relative to prior art foams.

That which is claimed is:

1. A cured, flame retardant polyorganosiloxane in the form of a blown foam containing
    (1) at least five parts by weight per million parts by weight of said foam of platinum in elemental or chemically combined form, said foam having uniformly dispersed therein
    (2) at least 0.1%, based on the weight of said foam, of at least one finely divided nonmetallic, fibrous heat resistant material, and
    (3) at least 0.1%, based on the weight of said foam, of at least one finely divided nonmetallic, cellular heat resistant material,
   wherein the combined concentrations of fibrous and cellular heat resistant materials do not exceed 40% of the total weight of said foam and the heat resistant materials do not soften or decompose below 1500° C.

2. A polyorganosiloxane according to claim 1 where components (2) and (3) each constitute from 0.1 to 20% by weight of said foam.

3. A polyorganosiloxane according to claim 2 where components (2) and (3) each constitute from 1 to 10% by weight of said foam.

4. A polyorganosiloxane according to claim 1 where component (2) is at least one member selected from the group consisting of glass, carbon, silicon carbide, silicon nitride, zircon, the alkali metal titanates, boron carbide, and silicates and oxides of zirconium, aluminum, chromium, magnesium, and calcium.

5. A polyorganosiloxane according to claim 4 where component (2) is selected from the group consisting of glass and carbon.

6. A polyorganosiloxane according to claim 1 where component (3) is at least one member selected from the group consisting of hollow glass microspheres, perlite, and vermiculite.

7. A polyorganosiloxane according to claim 1 where said matrix further comprises at least one uniformly dispersed finely divided filler other than (2) and (3).

8. A polyorganosiloxane according to claim 7 where said filler is at least one member selected from the group consisting of ground quartz, carbon black, and zinc oxide.

9. A polyorganosiloxane according to claim 1 where said blown foam is a reaction product of a room temperature foamable and curable composition comprising
    (A) at least one organohydrogensiloxane containing at least three silicon-bonded hydrogen atoms per molecule and an average of no more than one hydrogen atom per silicon atom,
    (B) at least one hydroxyl compound selected from the group consisting of silanols, siloxanols, and water, and
    (C) at least one polydiorganosiloxane selected from the group consisting of hydroxyl-containing polydiorganosiloxanes and triorganopolysiloxy-endblocked polydiorganosiloxanes containing at least two silicon-bonded vinyl groups per molecule, the concentration of said polydiorganosiloxanes being sufficient to impart a viscosity to said foamable and curable composition of from 0.1 to 100 Pa·s, measured at 25° C., wherein the organic groups bonded to the silicon atoms of the organohydrogensiloxane, polydiorganosiloxane, silanol, and siloxanol are selected from the group consisting of alkyl containing from 1 to 6 carbon atoms, cycloalkyl containing from 3 to 6 carbon atoms, vinyl, phenyl, and 3,3,3-trifluoropropyl, and any hydroxyl-containing polydiorganosiloxane constitutes at least a portion of (B).

10. A polyorganosiloxane according to claim 9 where said organic groups are selected from the group consisting of methyl, vinyl, phenyl, and 3,3,3-trifluoropropyl and the molar ratio of silicon-bonded hydrogen atoms to silicon-bonded hydroxyl groups is from 2.5 to 40.

11. A polyorganosiloxane according to claim 10 where said organic groups are methyl and vinyl.

12. A polyorganosiloxane according to claim 10 where said hydroxyl compound is at least one member selected from the group consisting of silanol and siloxanols and the molar ratio of silicon-bonded hydrogen atoms to silicon-bonded hydroxyl groups is from 4 to 10.

13. A polyorganosiloxane according to claim 9 where the foamable and curable composition comprises a silanol or siloxanol as the hydroxyl compound and a triorganosiloxy-endblocked polydiorganosiloxane containing an average of at least two silicon-bonded vinyl groups per molecule and the molar ratio of silicon-bonded hydrogen atoms to silicon-bonded hydroxyl groups is from 0.5 to 40.

14. A polyorganosiloxane according to claim 13 where said triorganosiloxy-endblocked polydiorganosiloxane is diorganovinylsiloxy terminated and is present at a concentration of up to 50%, based on the total weight of the triorganosiloxy-terminated polydiorganosiloxane and organohydrogensiloxane.

15. A polyorganosiloxane according to claim 9 where the organohydrogensiloxane is a polymethylhydrogensiloxane, the polydiorganosiloxane component includes at least one hydroxyl-terminated polydimethylsiloxane and at least one dimethylvinylsiloxy-endblocked polydimethylsiloxane, component (2) is glass or carbon, component (3) is glass microspheres or perlite, and the foamable and curable composition further comprises at least one finely divided filler other than (2) and (3) selected from the group consisting of carbon black, ground quartz, and zinc oxide.

16. A method for preparing a flame retardant room temperature curable polyorganosiloxane foam comprising
(I) forming a homogeneous reactive composition by blending together
(A) at least one organohydrogensiloxane containing at least three silicon-bonded hydrogen atoms per molecule and an average of no more than one hydrogen atom per silicon atom,
(B) at least one hydroxyl compound selected from the group consisting of silanols, siloxanols, and water,
(C) at least one polydiorganosiloxane selected from the group consisting of hydroxyl-containing polydiorganosiloxanes and triorganosiloxy-endblocked polydiorganosiloxanes containing an average of at least two silicon-bonded vinyl groups per molecule, the concentration of said polydiorganosiloxane being such that the viscosity of the reactive composition is within the range of from 0.1 to 100 Pa·s, measured at 25° C., wherein the organic groups bonded to the silicon atoms of the organohydrogensiloxane, silanol, siloxanol, and polydiorganosiloxane are selected from the group consisting of alkyl containing from 1 to 6 carbon atoms, cycloalkyl containing from 3 to 6 carbon atoms, vinyl, phenyl, and 3,3,3-trifluoropropyl, and any hydroxy-containing polydiorganosiloxane constitutes at least a portion of (B).
(1) at least five parts by weight per million parts by weight of said reactive composition of platinum in elemental or chemically combined form,
(2) at least 0.1%, based on the weight of said reactive composition of at least one finely divided nonmetallic, fibrous heat resistant material, and
(3) at least 0.1%, based on the weight of said reactive composition, of at least one finely divided nonmetallic, cellular, heat resistant material, wherein the combined concentrations of fibrous and cellular heat resistant materials do not exceed 40% of the total weight of said reactive composition, and said heat resistant materials do not soften or decompose below 1500° C., and
(II) allowing said reactive composition to form a cured polyorganosiloxane foam exhibiting an increased resistance to burn-through relative to polyorganosiloxane foams prepared using either a fibrous or a cellular heat resistant material.

17. A method according to claim 16 where components (2) and (3) each constitute from 0.1 to 20% by weight of the reactive composition.

18. A method according to claim 17 where components (2) and (3) each constitute from 1 to 10% by weight of the reactive composition.

19. A method according to claim 16 where component (2) is at least one member selected from the group consisting of glass, carbon, silicon carbide, silicon nitride, zircon, the alkali metal titanates, boron carbide, and the silicates and oxides of zirconium, aluminum, chromium, magnesium, and calcium.

20. A method according to claim 19 where component (2) is glass or carbon.

21. A method according to claim 16 where said cellular heat resistant material comprises at least one member selected from the group consisting of hollow glass microspheres, perlite, and vermiculite.

22. A method according to claim 16 where the reactive composition further comprises at least one uniformly dispersed finely divided filler other than (2) or (3).

23. A method according to claim 22 where said finely divided filler is at least one member selected from the group consisting of ground quartz, carbon black, and zinc oxide.

24. A method according to claim 16 where said organic groups are selected from the group consisting of methyl, vinyl, phenyl, and 3,3,3-trifluoropropyl and the molar ratio of silicon-bonded hydrogen atoms to silicon-bonded hydroxyl groups is from 2.5 to 40.

25. A method according to claim 24 where said organic groups are methyl and vinyl.

26. A method according to claim 16 where said hydroxyl compound is at least one member selected from the group consisting of silanols and siloxanols and the molar ratio of silicon-bonded hydrogen atoms to silicon-bonded hydroxyl groups is from 4 to 10.

27. A method according to claim 26 where the reactive composition comprises a silanol or siloxanol as the hydroxyl compound and a triorganosiloxy-endblocked polydiorganosiloxane containing an average of at least two silicon-bonded vinyl groups per molecule and the molar ratio of silicon-bonded hydrogen atoms to silicon-bonded hydroxyl groups is from 0.5 to 40.

28. A method according to claim 27 where said triorganosiloxy end-blocked polydiorganosiloxane is diorganovinylsiloxy terminated and is present at a concentration of up to 50%, based on the total weight of the triorganosiloxy-terminated polydiorganosiloxane and organohydrogensiloxane.

29. A method according to claim 16 where the organohydrogensiloxane is a polymethylhydrogensiloxane, the polydiorganosiloxane component includes at least one hydroxyl-terminated polydimethylsiloxane and at least one dimethylvinylsiloxy-endblocked polydimethylsiloxane, resistant material is glass or carbon, the cellular heat resistant material is hollow glass microspheres or perlite, and the reactive composition employed to prepare the foam further comprises at least one finely divided filler selected from the group consisting of carbon black, ground quartz, and zinc oxide.

* * * * *

UNITED STATES PATENT AND TRADEMARK OFFICE
CERTIFICATE OF CORRECTION

PATENT NO. : 4,433,069
DATED : February 21, 1984
INVENTOR(S) : Jack R. Harper

It is certified that error appears in the above-identified patent and that said Letters Patent is hereby corrected as shown below:

In column 7, line 31, "to" should read -- is --.

In column 8, line 19, "mixture of a" should read
    -- mixture or a --.

In column 9, line 42, "as" should read -- at --.

In column 11, line 58, "pip" should read -- pipe --.

Signed and Sealed this

Twenty-sixth Day of February 1985

[SEAL]

Attest:

DONALD J. QUIGG

Attesting Officer  Acting Commissioner of Patents and Trademarks